(12) United States Patent
Ogawa et al.

(10) Patent No.: US 9,888,436 B2
(45) Date of Patent: Feb. 6, 2018

(54) WIRELESS COMMUNICATION APPARATUS CAPABLE OF COMMUNICATING WITH WIRELESS COMMUNICATION DEVICE HAVING ACCESS POINT FUNCTION

(71) Applicant: SEIKO EPSON CORPORATION, Tokyo (JP)

(72) Inventors: Yohei Ogawa, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/204,020

(22) Filed: Jul. 7, 2016

(65) Prior Publication Data

US 2017/0041860 A1 Feb. 9, 2017

(30) Foreign Application Priority Data

Aug. 4, 2015 (JP) .................................. 2015-154579

(51) Int. Cl.
*H04W 4/00* (2009.01)
*H04W 48/16* (2009.01)
(Continued)

(52) U.S. Cl.
CPC .............. *H04W 48/16* (2013.01); *H04W 4/00* (2013.01); *H04W 48/12* (2013.01); *H04W 48/18* (2013.01); *H04W 48/20* (2013.01); *H04W 88/06* (2013.01)

(58) Field of Classification Search
CPC ..... H04W 48/16; H04W 48/18; H04W 84/18; H04W 88/04; H04W 48/20; H04W 48/12; H04W 88/06; H04W 4/00
(Continued)

(56) References Cited

U.S. PATENT DOCUMENTS

| 6,400,961 | B1 * | 6/2002 | Lillie | .................... | H04W 48/16 |
| | | | | | 455/343.2 |
| 2008/0261640 | A1 * | 10/2008 | Yoshida | ............. | H04N 1/00278 |
| | | | | | 455/517 |

(Continued)

FOREIGN PATENT DOCUMENTS

| JP | 2013-219430 A | 10/2013 |
| JP | 2015-060383 A | 3/2015 |

*Primary Examiner* — Mong-Thuy Tran
(74) *Attorney, Agent, or Firm* — Global IP Counselors, LLP

(57) ABSTRACT

A wireless communication apparatus comprises: a search unit; a determination unit; and a wireless connection processing unit. The search section carries out an SSID (network identification information) search for at least one wireless communication device that has an access point function via a wireless communication section. The determination unit determines, among SSIDs found as a result of search, an SSID that disappeared from the search target of the wireless communication section and has appeared again after disappearance. The wireless connection processing section recognizes, as a connection target device, the wireless communication device corresponding to the determined network identification information, and performs processing for wireless connection to the connection target device. The user operates an operation unit in accordance with the instruction of the guidance screen of the wireless communication apparatus to turn a soft access point OFF and thereafter ON.

10 Claims, 7 Drawing Sheets

(51) Int. Cl.
      *H04W 48/18*       (2009.01)
      *H04W 48/20*       (2009.01)
      *H04W 48/12*       (2009.01)
      *H04W 88/06*       (2009.01)

(58) Field of Classification Search
     USPC .......................................................... 455/434
     See application file for complete search history.

(56) References Cited

U.S. PATENT DOCUMENTS

| | | | |
|---|---|---|---|
| 2009/0063671 A1* | 3/2009 | Guidi | H04L 12/2803 709/224 |
| 2009/0271709 A1* | 10/2009 | Jin | H04L 63/20 715/739 |
| 2011/0063990 A1* | 3/2011 | Nogawa | H04W 76/028 370/252 |
| 2013/0057908 A1* | 3/2013 | Park | H04L 61/2015 358/1.15 |
| 2013/0265935 A1 | 10/2013 | Matsuda | |
| 2013/0322329 A1* | 12/2013 | Visuri | H04W 48/16 370/328 |
| 2014/0240776 A1* | 8/2014 | Suzuki | G06F 3/1296 358/1.15 |
| 2015/0023334 A1* | 1/2015 | Suga | H04W 48/16 370/338 |
| 2015/0081050 A1 | 3/2015 | Miwa et al. | |
| 2016/0127424 A1* | 5/2016 | Lee | H04W 48/16 370/315 |
| 2016/0330635 A1* | 11/2016 | Chhabra | H04L 67/104 |
| 2016/0360349 A1* | 12/2016 | Goto | H04W 4/008 |

* cited by examiner

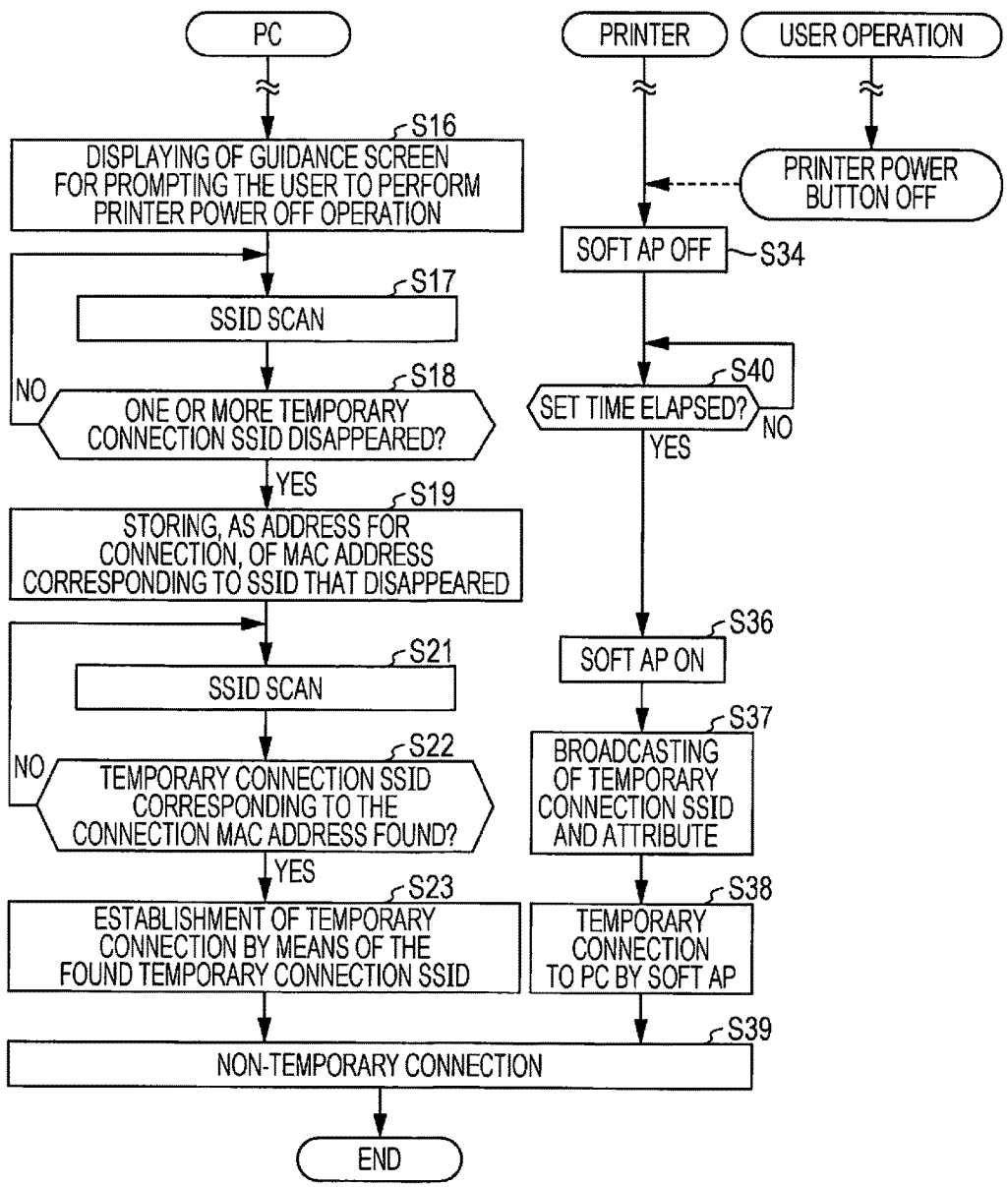

WIRELESS COMMUNICATION APPARATUS CAPABLE OF COMMUNICATING WITH WIRELESS COMMUNICATION DEVICE HAVING ACCESS POINT FUNCTION

CROSS REFERENCES TO RELATED APPLICATIONS

This application claims priority to Japanese Application No. 2015-154579, filed Aug. 4, 2015, the entirety of which is incorporated by reference herein.

BACKGROUND

1. Technical Field

The present invention relates to a wireless communication apparatus capable of communicating with a wireless communication device having an access point function, a wireless communication method, and a computer-readable storage medium.

2. Related Art

In related art, various techniques have been proposed for making user setting easier so that a connection for wireless communication can be established with ease between pieces of equipment each having a wireless communication function. For example, the following technique is disclosed in JP-A-2013-219430. In a wireless communication system, first communication equipment and second communication equipment communicate with each other wirelessly. The first communication equipment (e.g., PC) includes a judgment unit that judges whether the equipment itself is connected to a relay apparatus (e.g., access point) or not. The first communication equipment includes a communication unit that performs wireless communication in a first connection mode if connected to the relay apparatus or in a second connection mode if not connected to the relay apparatus. In the first connection mode, the first communication equipment communicates with second communication equipment (e.g., printer) via the relay apparatus. In the second connection mode, the first communication equipment communicates with the second communication equipment not via the relay apparatus.

In the second connection mode, when a new wireless connection of second communication equipment is to be made in a network environment in which there exists first communication equipment that has already been connected to a relay apparatus wirelessly, the second communication equipment establishes a temporary connection, for example, an ad-hoc connection, to the first communication equipment. Then, the second communication equipment acquires wireless connection information set in the first communication equipment from the first communication equipment through wireless communication based on temporary connection. Next, the second communication equipment establishes a connection to the access point by using the acquired wireless connection information. By this means, non-temporary-connected wireless communication can be performed between the first communication equipment and the second communication equipment.

As another example, the following technique is disclosed in JP-A-2015-060383. A wireless communication apparatus, for example, a computer with a CD-ROM set therein, launches a setup program, and outputs a guidance for prompting a user to turn on the power of a wireless communication device such as a printer. After the power on, the wireless communication device shifts into a wireless connection mode automatically without any operation from a user, except for power-on operation. An ad-hoc wireless connection is established from the wireless communication apparatus (computer) to the wireless communication device.

By the way, it is necessary that network identification information (SSID, etc.) having been set for temporary connection in a wireless communication apparatus be the same as network identification information used for temporary connection by a wireless communication device such as a printer. However, if individual codes that differ from one wireless communication device to another are used for the setting of network identification information, it will result in a decrease in the productivity of wireless communication devices. To avoid low productivity, preferably, for example, common network identification information varying by model should be set.

However, if network identification information for temporary connection is shared among wireless communication devices of each identical model, the following problem might arise. In a case where there exist plural wireless communication devices of the same model in an area therearound, there is a possibility that a wireless communication apparatus might find plural pieces of the same network identification information. In such a case, it is difficult to determine, among the plural pieces of the same network identification information found, the network identification information of the wireless communication device to which the user wishes a connection to be established. This makes it difficult for the user's wireless communication apparatus to get connected to the wished wireless communication device wirelessly.

The case where plural pieces of the same network identification information might be found is not limited to the above example. Other examples are: common network identification information is set for each identical manufacturer, for each identical time period such as a device sales period, for each identical manufacturing lot, or for each identical territory such as a sales territory. Moreover, since network identification information is not "unique-to-equipment" information, even if individual network identification information is set for each wireless communication device, there is a possibility that a wireless communication apparatus might find plural pieces of the same network identification information. The problem of this kind is not limited to a case where processing performed by establishing a wireless connection between a wireless communication apparatus and a wireless communication device is the setting of wireless connection information into the wireless communication device. The same problem might arise also in a case where other processing is intended, as long as a wireless connection between a wireless communication apparatus and a wireless communication device is established on the basis of network identification information.

SUMMARY

An advantage of some aspects of the present invention is to provide a wireless communication apparatus capable of establishing a wireless connection to a wireless communication device as wished by a user even in a case where plural wireless communication devices of the same network identification information setting are found, a wireless communication method, and a storage medium.

Solving means according to some aspects, and operational effects thereof, are described below.

A wireless communication apparatus according to one aspect comprises: a search section that searches for network identification information of at least one wireless communication device that has an access point function via a wireless communication section; a determination section that determines, among pieces of network identification information found as a result of search, a piece of network identification information that disappeared from a search target of the wireless communication section and has appeared again after disappearance; and a wireless connection processing section that recognizes, as a connection target device, the wireless communication device corresponding to the determined network identification information, and performs processing for wireless connection to the connection target device.

In the above configuration of the wireless communication apparatus, the search section searches for network identification information of at least one wireless communication device that has an access point function via the wireless communication section. The determination section determines, among pieces of network identification information found as a result of search, a piece of network identification information that disappeared from the search target of the wireless communication section and has appeared again after disappearance. The wireless connection processing section recognizes, as a connection target device, the wireless communication device corresponding to the determined network identification information, and performs processing for wireless connection to the connection target device. Even if plural pieces of the same network identification information are found as the result of the search by the search section, it is possible to determine the network identification information corresponding to the wireless communication device intended by the user and to establish a wireless connection to the ID-determined wireless communication device (connection target device).

Preferably, the wireless communication apparatus should further comprise: a first guidance section that provides a guidance for prompting a user to perform a first operation to turn off a wireless function of the connection target device; and a second guidance section that provides a guidance for prompting the user to perform a second operation to turn on the wireless function of the connection target device, wherein the wireless connection processing section recognizes, as the connection target device, the wireless communication device corresponding to the network identification information that disappeared from the search target of the wireless communication section due to the first operation and has appeared again due to the second operation after the disappearance among the pieces of network identification information of the at least one wireless communication device found as the result of the search, and performs the processing for the wireless connection to the connection target device.

The first guidance section provides a guidance for prompting the user to perform a first operation to turn off the wireless function of the connection target device. The user performs the first operation in accordance with the guidance, thereby turning off the wireless function of the connection target device. Next, the second guidance section provides a guidance for prompting the user to perform a second operation to turn on the wireless function of the connection target device. The user performs the second operation in accordance with the guidance, thereby turning on the wireless function of the connection target device. The determination section can determine, as the network identification information of the connection target device, the network identification information that disappeared from the search target of the wireless communication section due to the first operation and has appeared again due to the second operation after the disappearance among the pieces of network identification information of the wireless communication devices found as the result of the search by the search section. The wireless connection processing section recognizes, as the connection target device, the wireless communication device corresponding to the determined network identification information, and performs processing for wireless connection to the connection target device. If the user performs the first operation in accordance with the guidance of the first guidance section and the second operation in accordance with the guidance of the second guidance section, the wireless function is turned off and thereafter on, and, by the turning of the wireless function off and thereafter on, it is possible to let the wireless communication apparatus know the connection target device among the wireless communication devices found as the result of the search.

Preferably, the wireless communication apparatus should further comprise: a first guidance section that provides a guidance for prompting a user to perform a first operation to turn off a wireless function of the connection target device; wherein the connection target device is configured to turn on the wireless function after a lapse of set time from turning off of the wireless function due to the first operation; and wherein the wireless connection processing section recognizes, as the connection target device, the wireless communication device corresponding to the network identification information that disappeared from the search target of the wireless communication section due to the first operation and has appeared again after the disappearance among the pieces of network identification information of the at least one wireless communication device found as the result of the search, and establishes the wireless connection to the connection target device.

The first guidance section provides a guidance for prompting the user to perform a first operation to turn off the wireless function of the connection target device. The user performs the first operation on the connection target device to turn off the wireless function. The wireless function turns on after the lapse of set time from the turning off of the wireless function. The wireless connection processing section recognizes, as the connection target device, the wireless communication device corresponding to the network identification information that disappeared from the search target of the wireless communication section due to the first operation and has appeared again after the lapse of the set time among the pieces of network identification information of the wireless communication devices found as the result of the search, and establishes the wireless connection to the connection target device. The guidance for prompting the user to turn on the wireless function of the connection target device is unnecessary because the wireless function is turned on for appearance again upon the lapse of the set time from the turning off of the wireless function. That is, it is possible to determine the wireless communication device intended by the user as the connection target device just by the user's performing the first operation of turning off the wireless function.

Preferably, in the above wireless communication apparatus, at least either the first operation of turning off the wireless function and the second operation of turning on the wireless function is the operation of a power operation section that is operated when the user turns the power of the wireless communication device on/off.

In this configuration, at least either the first operation of turning off the wireless function and the second operation of turning on the wireless function is the operation of a power operation section that is operated when the user turns the power of the wireless communication device on/off. Since the power operation section is a section operated for power on/off, the use of it for wireless function on/off does not cause any feeling of strangeness.

Preferably, in the above wireless communication apparatus, at least the first operation of turning off the wireless function is the operation of the power operation section that is operated when the user turns the power of the wireless communication device on/off; wherein the wireless communication device is configured to turn off the wireless function without turning the power off when the first operation is performed by means of the power operation section; and wherein the wireless connection processing section recognizes, as the connection target device, the wireless communication device corresponding to the network identification information that disappeared from the search target of the wireless communication section due to the first operation and has appeared again due to the second operation after the disappearance among the pieces of network identification information of the at least one wireless communication device found as the result of the search, and performs the processing for the wireless connection to the connection target device.

In this configuration, at least the first operation of turning off the wireless function is the operation of the power operation section. The wireless function is turned off without turning the power off when the first operation is performed by means of the power operation section. For example, if the power were turned off, it would take time for startup at the time of the powering on of the wireless communication device again from the power off state and, therefore, it would take longer until setting finishes after the startup. Since the power is not turned off when the first operation is performed by means of the power operation section, however, there is no waiting time for startup at the time of the second operation after the first operation. Therefore, it is possible to finish setting processing in a shorter time.

Preferably, in the above wireless communication apparatus, the guidance for prompting the user to perform the second operation is provided by the second guidance section after the disappearance of any one piece of network identification information due to the first operation among the pieces of network identification information found as the result of the search.

In this configuration, the guidance for prompting the user to perform the second operation is provided by the second guidance section after the disappearance of at least one piece of network identification information due to the first operation among the pieces of network identification information found as the result of the search. This ensures the disappearance of the network identification information corresponding to the connection target device due to the first operation among the pieces of network identification information of the wireless communication devices found as the result of the search and ensures the subsequent appearance thereof again due to the second operation.

Preferably, in the above wireless communication apparatus, device identification information corresponding to the network identification information that disappeared due to the first operation among the pieces of network identification information found as the result of the search by the search section is acquired and stored into a memory; and, when the network identification information corresponding to the same device identification information appears again thereafter as the result of the search by the search section, the wireless connection processing section recognizes, as the connection target device, the wireless communication device corresponding to this network identification information, and performs the processing for the wireless connection to the connection target device.

In this configuration, device identification information corresponding to the network identification information that disappeared due to the first operation by the user among the pieces of network identification information found as the result of the search by the search section is acquired and stored into a memory. When the network identification information corresponding to the same device identification information as that of the one disappeared appears again thereafter as the result of the search by the search section, the wireless communication apparatus recognizes, as the connection target device, the wireless communication device corresponding to this network identification information, and performs the processing for the wireless connection to the connection target device. For example, if the management were based on network identification information alone, the wireless communication device having appeared might not be the same as the wireless communication device that disappeared. Because of association with unique device identification information, however, it is possible to determine the connection target device with a confirmation that the wireless communication device having appeared is the same as the wireless communication device that disappeared.

Preferably, in the above wireless communication apparatus, upon establishment of the wireless connection to the connection target device, the wireless connection processing section transmits, to the connection target device via the wireless connection, wireless connection information having been set to the wireless communication apparatus itself for purpose of connection to a wireless relay; and the connection target device joins onto a wireless network of the wireless relay by means of the wireless connection information, and, as a result, a wireless connection to the wireless communication device is established via the wireless relay.

In this configuration, upon establishment of the wireless connection to the connection target device, the wireless connection processing section transmits, to the connection target device via the wireless connection, wireless connection information having been set to the wireless communication apparatus itself for purpose of connection to a wireless relay. The connection target device joins onto a wireless network of the wireless relay by means of the wireless connection information, and, as a result, a wireless connection between the wireless communication apparatus and the wireless communication device is established via the wireless relay. Since the wireless connection information is transmitted via the wireless connection, it is possible to establish the wireless connection between the wireless communication apparatus and the wireless communication device via the wireless relay.

A wireless communication method according to one aspect comprises: searching for network identification information of at least one wireless communication device that has an access point function via a wireless communication section; determining, among pieces of network identification information found as a result of search, a piece of network identification information that disappeared from a search target of the wireless communication section and has appeared again after disappearance; and wireless connection processing of recognizing, as a connection target device, the wireless communication device corresponding to the determined network identification information, and performing processing for wireless connection to the connection target device. With this method, the same operational effects as those of the wireless communication apparatus can be obtained.

A non-transitory computer-readable storage medium according to one aspect stores a program for causing a computer of a wireless communication apparatus to execute a process, comprising: searching for network identification information of at least one wireless communication device that has an access point function via a wireless communication section; determining, among pieces of network identification information found as a result of search, a piece of network identification information that disappeared from a search target of the wireless communication section and has appeared again after disappearance; and wireless connection processing of recognizing, as a connection target device, the wireless communication device corresponding to the determined network identification information, and performing processing for wireless connection to the connection target device. By execution of the program by the computer, the same operational effects as those of the wireless communication apparatus can be obtained.

BRIEF DESCRIPTION OF THE DRAWINGS

The invention will be described with reference to the accompanying drawings, wherein like numbers reference like elements.

FIG. 9 is a sequence chart that illustrates temporary connection processing for the setting of wireless connection information according to a third embodiment.

DESCRIPTION OF EXEMPLARY EMBODIMENTS

First Embodiment

Figure 1:
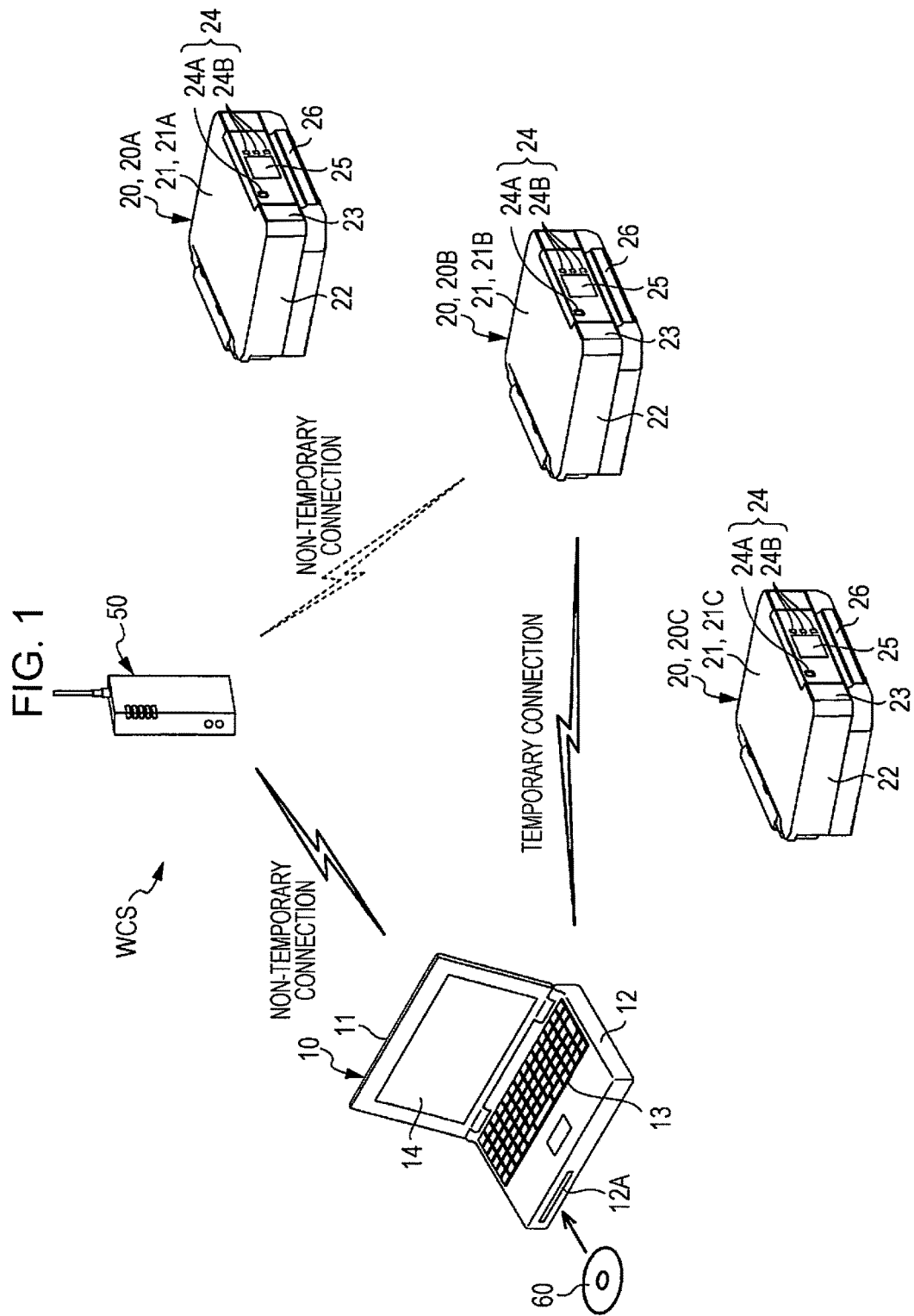
FIG. 1 is a schematic view of a wireless communication system according to a first embodiment.

With reference to the accompanying drawings, a wireless communication system according to a first embodiment of the invention will now be explained. As illustrated in FIG. 1, a wireless communication system WCS includes a wireless communication apparatus 10, a wireless communication device 20, and, as an example of a wireless relay, an access point 50. In FIG. 1, the wireless communication apparatus 10 is, for example, a personal computer (hereinafter referred to as "PC 11"), and the wireless communication device 20 (20A, 20B, 20C) is, for example, a printing apparatus 21 (21A, 21B, 21C). In the illustrated example, one wireless communication apparatus 10 and three (FIG. 1) wireless communication devices 20 (20A-20C) are located inside the wireless network area of the access point 50. In this example, each of the wireless communication apparatus 10, the wireless communication device 20, and the access point 50 has a wireless communication function conforming to the IEEE802.11 standard. In the description below, communication conforming to the IEEE802.11 standard is referred to as wireless LAN communication.

As illustrated in FIG. 1, the wireless communication apparatus 10 (PC 11) includes a mainframe 12, an operation unit 13, and a display unit 14. The mainframe 12 has an insertion slot 12A (refer to FIG. 1), into which a setup disc 60 such as a CD or a DVD can be set. Various programs that are necessary for setup of the wireless communication device 20 are stored in the setup disc 60. Various programs stored in the setup disc 60 set in the insertion slot 12A are read out by a reader not illustrated, and are installed into the wireless communication apparatus 10. Various programs mentioned here include, for example, a driver program for driving the wireless communication device 20, and a wireless setting assistance program for providing assistance in setting wireless connection information that is necessary for enabling the wireless communication device 20 to perform wireless communication via the access point 50. If the wireless communication apparatus 10 is the PC 11, it is not limited to a laptop PC illustrated as an example in FIG. 1. It may be, for example, a desktop PC or a tablet PC. Instead of the PC 11, the wireless communication apparatus 10 may be a PDA (Personal Digital Assistant) capable of performing wireless LAN communication with the wireless communication device 20, or a smart device such as a smartphone.

As illustrated in FIG. 1, the printing apparatus 21, which is an example of the wireless communication device 20, includes a body 22, which has a shape of a rectangular parallelepiped, and an operation panel 23, which is mounted on the front (right near side in FIG. 1) of the body 22. An operation unit 24 and a display unit 25 are provided on the operation panel 23. The operation unit 24 includes a power button 24A (power switch), which is an example of a power operation section, and various operation buttons 24B (operation switches), which constitute an example of other operation section. Specifically, the operation buttons 24B include, for example, a selection switch for selecting an item on a menu displayed on the display unit 25, and an execution switch for print execution.

A cassette 26, which can accommodate plural sheets of a medium such as paper, is detachably inserted under the body 22. Receiving print data from the wireless communication apparatus 10 (e.g., PC 11) through wireless LAN communication, for example, the printing apparatus 21 feeds the medium from the cassette 26 to a printing unit (not illustrated) provided inside the body 22. Then, the printing unit prints text or an image based on the print data onto the fed medium. The printing apparatus 21 may be connected to the PC 11 through a communication cable (not illustrated) for wired communication, and may perform printing based on the print data received non-wirelessly from the PC 11. The printing apparatus 21 may be used as a stand-alone printer. For example, a user may insert a portable storage medium such as a memory card or a USB memory into the slot of the body 22, and operate the operation unit 24 to cause the reader not illustrated to read image data, etc. out of the portable storage medium and to cause the printing unit to print an image, etc. based on the read data onto a medium.

Figure 2:
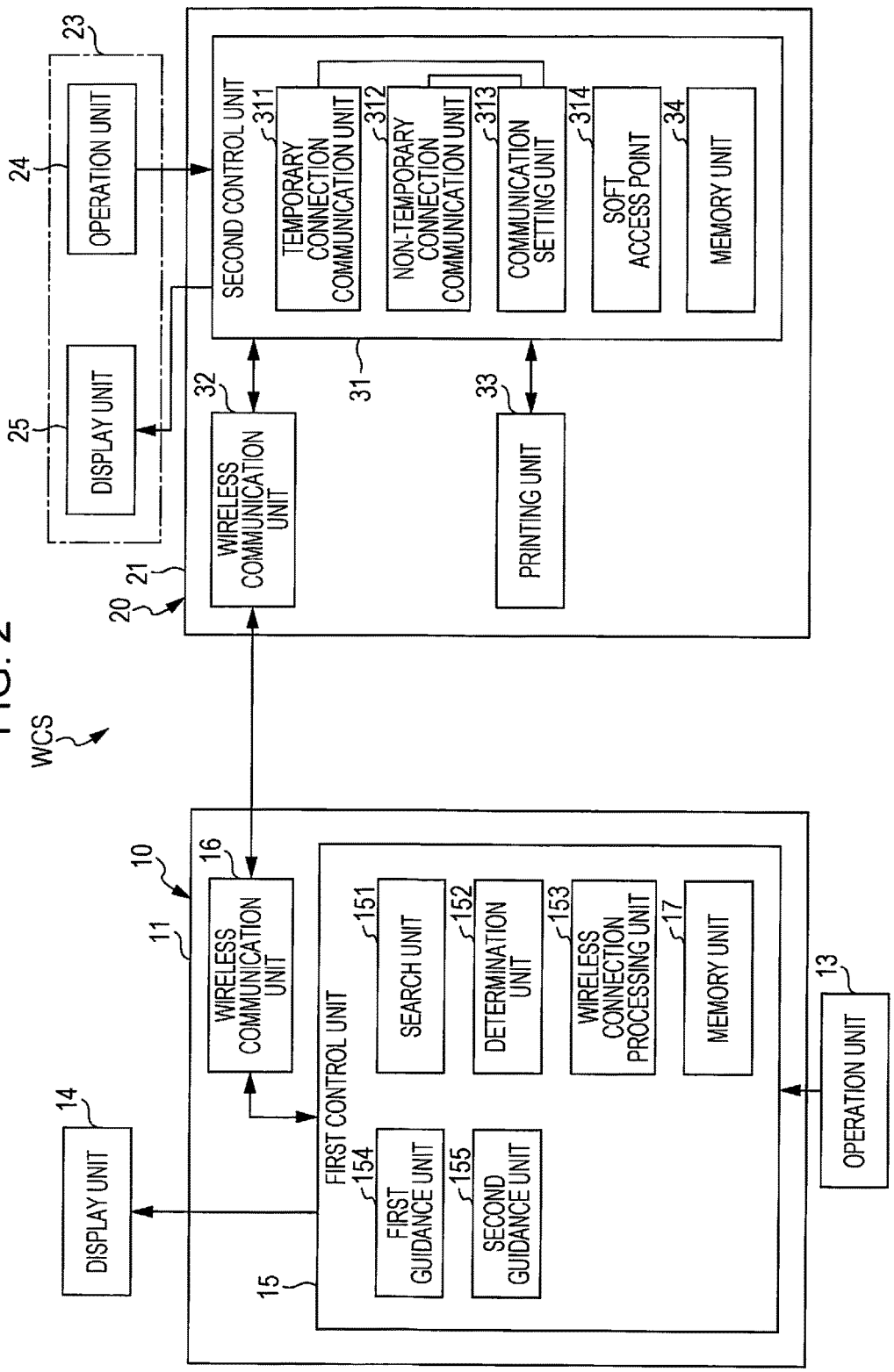
FIG. 2 is a block diagram that illustrates the electric and functional configuration of a wireless communication apparatus and a wireless communication device that constitute a wireless communication system.

As illustrated in FIG. 2, the wireless communication apparatus 10 includes a first control unit 15 and a wireless communication unit 16. The wireless communication unit 16 is provided with an electronic circuit for performing wireless LAN communication conforming to the IEEE802.11 standard. The first control unit 15 is provided with a CPU not illustrated, a memory unit 17, and an input/output circuit, etc. The memory unit 17 includes a main memory and a ROM, etc. not illustrated. The first control unit 15 performs various kinds of control and processing, for example, the control of the wireless communication unit 16 and the display unit 14, by running, on the CPU, various programs stored in the memory unit 17.

The programs include a wireless setting assistance program installed from the setup disc 60 or via the Internet, etc. besides OS (Operating System). The wireless setting assistance program is launched by the CPU of the first control unit 15 when triggered by the operation of setting the setup disc 60 into the insertion slot 12A of the mainframe 12 (refer to FIG. 1) by a user or by the operation of selecting "Wireless Setting" in an electronic manual (data containing a program startup link). In this example, through the execution of the wireless setting assistance program by the first control unit 15 (computer), the first control unit 15 behaves as a search unit 151, a determination unit 152, and a wireless connection processing unit 153.

The search unit 151 has a function of searching for (scanning) an SSID (Service Set Identifier), which is an example of network identification information, via the wireless communication unit 16. For example, the search unit 151 searches for (scans) the SSID of the wireless communication device 20 (e.g., printing apparatus 21) having an access point function. As common network identification information for each model, for example, a temporary connection SSID (i.e., SSID for temporary connection) has been set in advance in the printing apparatus 21, which is an example of the wireless communication device 20. By running the wireless setting assistance program, the first control unit 15 provides assistance in wireless setting of a non-temporary connection SSID (i.e., SSID for non-temporary connection), which is an example of network identification information, into the wireless communication device 20.

A non-temporary connection SSID, which is an example of network identification information that is necessary for joining onto the wireless network of the access point 50, has already been set in the wireless communication apparatus 10. Wireless connection information is stored in the memory unit 17. The wireless connection information contains a non-temporary connection SSID that is necessary for non-temporary connection to the access point 50 and a cryptographic key (encryption key) for it. In this example, when the wireless communication device 20 is powered on first time, a non-temporary connection SSID, which is an example of network identification information, is set into the wireless communication device 20. In the present embodiment, an SSID and a cryptographic key correspond to an example of wireless connection information.

When wireless setting assistance processing is performed, first, the wireless communication apparatus 10 establishes a temporary connection to the setting target wireless communication device 20 wirelessly and transmits, to the wireless communication device 20 in reply to a request from the wireless communication device 20, wireless connection information that contains, in addition to a cryptographic key, a non-temporary connection SSID that has been set in the wireless communication apparatus 10 in advance and is necessary for joining onto the wireless network of the access point 50. The wireless communication apparatus 10 sets the non-temporary connection SSID into the wireless communication device 20 by transmitting the non-temporary connection SSID to the wireless communication device 20.

To provide assistance in wireless setting at the wireless communication device 20, the search unit 151 performs SSID scanning to search for a temporary connection SSID. If a temporary connection SSID is found, the found temporary connection SSID is stored into the memory unit 17 as that of the setting target device. For the scanning of a temporary connection SSID by the search unit 151, a value preset in the wireless setting assistance program is used. When this processing is performed, as an example of device identification information by means of which it is possible to identify the wireless communication device 20 corresponding to the found temporary connection SSID, the search unit 151 acquires a MAC address, which has been uniquely assigned to each wireless communication device 20. The acquired MAC address is temporarily stored into the memory unit 17.

The wireless connection processing unit 153 recognizes, as the connection target device, the wireless communication device 20 corresponding to the temporary connection SSID found by the search unit 151, and performs processing for wireless connection (temporary connection) to the connection target device. First, the wireless connection processing unit 153 sends a query to the OS of the PC 11 to acquire wireless connection information that contains, in addition to a cryptographic key, the preset SSID of the access point 50 (non-temporary connection SSID). The cryptographic key set in the OS is, for example, generated from the SSID in accordance with a predetermined rule in the wireless setting assistance program.

If there exist plural wireless communication devices 20 that are the printing apparatuses 21 of the same model in the same network area, the search unit 151 finds a plurality of the same temporary connection SSIDs (identifiers) when performing SSID scanning. In this case, the wireless communication apparatus 10 has to determine the setting target wireless communication device 20. If a plurality of the same temporary connection SSIDs has been found as a result of the search, the determination unit 152 is used for the purpose of determining a temporary connection SSID corresponding to one wireless communication device 20 that is the setting target device among those for the plurality of the temporary connection SSIDs found.

The determination unit 152 illustrated in FIG. 2 has the following determination function. If one among the temporary connection SSIDs set for the wireless communication devices 20 found as a result of the search by the search unit 151 disappears from the search target of the wireless communication unit 16 and if, after the disappearance, an SSID corresponding to a MAC address that is the same as the MAC address of the one that disappeared appears again, the determination unit 152 determines the SSID having appeared again as that of the setting target wireless communication device 20. The determination unit 152 identifies, as the target of temporary connection, the MAC address of the wireless communication device 20 determined as the target of setting.

The wireless connection processing unit 153 recognizes, as the connection target device, the wireless communication device 20 corresponding to the temporary connection SSID determined by the determination unit 152, and performs processing for wireless connection (temporary connection) to the connection target device. Except for during the execution of the wireless setting assistance program, for communication, the wireless connection processing unit 153 performs processing for wireless non-temporary connection to the wireless communication device 20. There are two types in non-temporary connection, which are: processing for wireless connection to the wireless communication device 20 via the access point 50 and processing for direct wireless connection to the wireless communication device 20 not via the access point 50.

The first control unit 15 includes a first guidance unit 154 and a second guidance unit 155. The first guidance unit 154 causes the display unit 14 to display a guidance screen 71 (refer to FIG. 3), which prompts the user to perform first operation of turning the wireless function of the wireless communication device 20 OFF. The second guidance unit 155 causes the display unit 14 to display a guidance screen 73 (refer to FIG. 5), which prompts the user to perform second operation of turning the wireless function of the wireless communication device 20 ON after the first operation. In this example, the power button 24A, which is operated for power ON/OFF of the wireless communication device 20, is used for both the first operation and the second operation. Specifically, the first operation is power OFF operation, and the second operation is power ON operation. The first operation and the second operation are not limited to the operation of the power button 24A. The power button 24A may be used for either the first operation or the second operation, instead of both. Any of other operation buttons 24B that are not the power button 24A may be used for either the first operation or the second operation, or both. The guidance by the first guidance unit 154 for the first operation and the guidance by the second guidance unit 155 for the second operation are not limited to visual display guidance. For example, voice guidance may be used.

As illustrated in FIG. 2, the wireless communication device 20, which is, for example, the printing apparatus 21, includes a second control unit 31, a wireless communication unit 32, and a printing unit 33. The printing unit 33 prints text or an image based on print data onto a medium such as plain paper, photo paper, or a synthetic resin sheet by using a well-known printing method such as an electro-photographic method or an ink-jet method. The printing apparatus 21 may be a serial printer, in which a print head of the printing unit 33 performs printing for one line after another while reciprocating in a scanning direction. The printing apparatus 21 may be a line printer, which is provided with an elongated print head that is long enough for printing for one line at a time. The printing unit 33 includes a transportation mechanism for transporting a print target medium, a transportation motor that is a transportation power source, and a print head that performs printing by ejecting ink onto the medium.

The wireless communication unit 32 is provided with an electronic circuit for performing wireless LAN communication conforming to the IEEE802.11 standard. The second control unit 31 is a computer made up of integrated circuits (IC chips), etc. mounted on a board provided inside the body 22. The second control unit 31 is provided with a CPU not illustrated, a memory unit 34, and an input/output circuit, etc. The memory unit 34 includes a main memory, for example, a RAM, and a nonvolatile memory. Various programs including a wireless setting processing program and a control program for controlling the operation of the wireless communication device 20 (e.g., print operation) are stored in the memory unit 34.

The second control unit 31 illustrated in FIG. 2 loads the control program stored in the nonvolatile memory into the main memory and executes the loaded program on the CPU, thereby controlling the display unit 25, the wireless communication unit 32, and the printing unit 33, etc. Through the execution of the wireless setting processing program by the CPU of the second control unit 31, the second control unit 31 behaves as a temporary connection communication unit 311, a non-temporary connection communication unit 312, a communication setting unit 313, and a soft access point 314 (hereinafter may be abbreviated as "soft AP 314"). The soft AP 314 causes the wireless communication device 20 to behave as a wireless access point virtually. Provided with the soft AP 314, the wireless communication device 20 has an access point function.

When wireless setting processing is performed, the temporary connection communication unit 311 performs processing for wireless communication based on temporary connection with the wireless communication apparatus 10 by using the access point function of the soft AP 314. The temporary connection communication unit 311 broadcasts a temporary connection SSID via the wireless communication unit 32. The temporary connection communication unit 311 establishes a wireless temporary connection to the wireless communication apparatus 10 having found the temporary connection SSID by scanning. The second control unit 31 acquires wireless connection information that contains a non-temporary connection SSID and a cryptographic key from the wireless communication apparatus 10 through wireless communication based on temporary connection. If the wireless communication apparatus 10 has the past experience of connection to the access point 50, the second control unit 31 acquires the SSID of the access point 50 as the non-temporary connection SSID from the wireless communication apparatus 10. If the wireless communication apparatus 10 does not have any past experience of connection to the access point 50, the second control unit 31 acquires, from the wireless communication apparatus 10, for non-temporary connection, an SSID by means of which it is possible to perform ad-hoc wireless communication with the wireless communication apparatus 10.

If a non-temporary connection SSID is found by performing SSID scanning via the wireless communication unit 32, the non-temporary connection communication unit 312 establishes a wireless connection to the access point 50 on the basis of the non-temporary connection SSID so that wireless communication with the wireless communication apparatus 10 can be performed via the access point 50 in an infrastructure mode. If no access point 50 can be found in the search area of the wireless communication unit 32, the non-temporary connection communication unit 312 establishes a wireless connection to the wireless communication apparatus 10 in an ad-hoc mode.

The communication setting unit 313 makes settings for non-temporary connection on the basis of the wireless connection information received from the wireless communication apparatus 10. If wireless connection information containing the SSID of the access point 50 is received from the wireless communication apparatus 10 through wireless communication based on temporary connection, the communication setting unit 313 sets the infrastructure mode together with the wireless connection information. If wireless connection information containing the SSID of the wireless communication apparatus 10 in the ad-hoc mode is received, the communication setting unit 313 sets a peer-to-peer wireless communication mode together with the wireless connection information.

Figure 3:
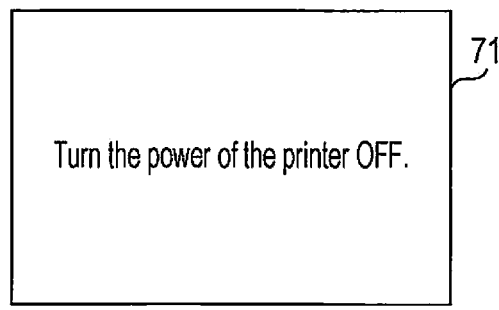
FIG. 3 is a diagram that illustrates a guidance screen displayed on the wireless communication apparatus for prompting a user to perform power OFF operation.

The first guidance unit 154 provided in the wireless communication apparatus 10 illustrated in FIG. 2 causes the display unit 14 to display the guidance screen 71 (FIG. 3). The guidance screen 71 prompts the user to perform power OFF operation as an example of the first operation to turn OFF the soft AP 314, which realizes the wireless function of the wireless communication device 20 that is the connection target device, to which the user wishes the connection to be established. When the disappearance of the temporary connection SSID corresponding to the powered-off wireless communication device 20 from the search target (search area) of the wireless communication unit 16 is detected as a result of the search (scanning) by the search unit 151, the first guidance unit 154 causes the display unit 14 to display a notification message screen 72 (FIG. 4), which notifies the user of the disappearance from the network search list.

The second guidance unit 155 causes the display unit 14 to display the guidance screen 73. The guidance screen 73 prompts the user to perform power ON operation as an example of the second operation to turn ON the soft AP 314, which realizes the wireless function of the wireless communication device 20 that is the connection target device. Specifically, the second guidance unit 155 causes the display unit 14 to display the guidance screen 73 for prompting the user to perform the second operation after confirmation of the disappearance, due to the first operation (e.g., power OFF operation), of any one SSID from the search target of the wireless communication unit 16 among the SSIDs of the wireless communication devices 20 found as a result of the search.

The wireless connection processing unit 153 recognizes, as the connection target device, the wireless communication device 20 corresponding to, among the SSIDs of the wireless communication devices 20 found as a result of the search, the temporary connection SSID that disappeared due to the first operation (e.g., power OFF operation) from the search target of the wireless communication unit 16 and, after the disappearance, has appeared again due to the second operation (e.g., power ON operation). Then, the wireless connection processing unit 153 establishes a wireless connection (temporary connection) to the wireless communication device 20 determined as the connection target device.

Next, with reference to FIG. 6, the operation of the wireless communication system WCS will now be explained. Described below is a wireless communication method for connecting the wireless communication device 20 to the wireless communication apparatus 10 via wireless LAN in which the access point 50 is a wireless relay (hereinafter may be simply referred to as "relay"). In the example below, the wireless communication apparatus 10 is the PC 11, and the wireless communication device 20 is the printing apparatus 21.

It is assumed that an SSID and a cryptographic key of wireless LAN in which the access point 50 is a relay has been set in the PC 11 in advance. It is further assumed that the PC 11 and the access point 50 are connected to each other in the infrastructure mode of the wireless LAN.

When the printing apparatus 21 is used first time after purchase, wireless connection information has not been set yet. Therefore, the first thing that the user has to do is to set wireless connection information into the printing apparatus 21. However, if the user is unaccustomed to the handling of the printing apparatus 21, wireless setting work, which requires the inputting of necessary wireless connection information such as an SSID and a cryptographic key by operating the operation unit 24, is fairly complex and troublesome. For easy setting, in the present embodiment, when the setup disc 60 that comes bundled with the printing apparatus 21 is set into the insertion slot 12A of the PC 11 by the user, the wireless setting assistance program is automatically loaded from the setup disc 60 by the built-in reader of the PC 11 to be installed into the PC 11. The CPU of the first control unit 15 runs the installed wireless setting assistance program. By this means, the first control unit 15 functions as each unit 151 to 155. A temporary connection SSID written at the time of the installing of the wireless setting assistance program is set in the memory unit 17 in the first control unit 15 of the PC 11. A temporary connection SSID that was written before shipment is set in the memory unit 34 in the second control unit 31 of the printing apparatus 21. The temporary connection SSID is a common code set for each model of the printing apparatus 21.

Through the function of each unit in the first control unit 15 of the PC 11, the PC 11 scans the temporary connection SSID to search for the printing apparatus 21. The PC 11 establishes a peer-to-peer (P2P) temporary connection to the printing apparatus 21 found as a result of the search. The PC 11 transmits the already-set wireless connection information (non-temporary connection SSID, etc.) of the access point 50 to the printing apparatus 21 through wireless communication based on temporary connection. The printing apparatus 21 sets the received wireless connection information (non-temporary connection SSID, etc.) by writing the received wireless connection information into its own memory area. This makes it possible for the printing apparatus 21 to get connected to the access point 50 non-temporarily by using the written wireless connection information and perform wireless communication with the PC 11 via the access point 50 in the infrastructure mode.

As illustrated in FIG. 1, plural (three in the illustrated example) wireless communication devices 20 (e.g., printing apparatuses 21) are located inside an area where the PC 11 can perform wireless communication. In the example of FIG. 1, it is assumed that at least two of the plural printing apparatuses 21 are of the same model, that the same temporary connection SSID that is common to those of the same model has been set, and that a non-temporary connection SSID has not been set yet. For example, if no wireless setting processing was performed when the user operated the power button 24A to power on the printing apparatus 21 first time, the temporary connection SSID remains to be set, and the wireless connection information containing the non-temporary connection SSID has not been set yet. In this case, plural printing apparatuses 21 (e.g., printing apparatuses 21A, 21B, and 21C) for which the same temporary connection SSID has been set exist inside the communication area of the wireless communication unit 16 of the PC 11.

If, as illustrated in FIG. 1, there exist plural printing apparatuses 21 of the same model in a power ON state in the neighborhood of the PC 11, with wireless settings not made yet, the PC 11 finds a plurality of temporary connection SSIDs with the same code when a search is conducted by the search unit 151. Therefore, the first control unit 15 of the PC 11 is not able to determine the printing apparatus 21 for which the user wishes the settings to be made (e.g., printing apparatus 21B).

Figure 6:
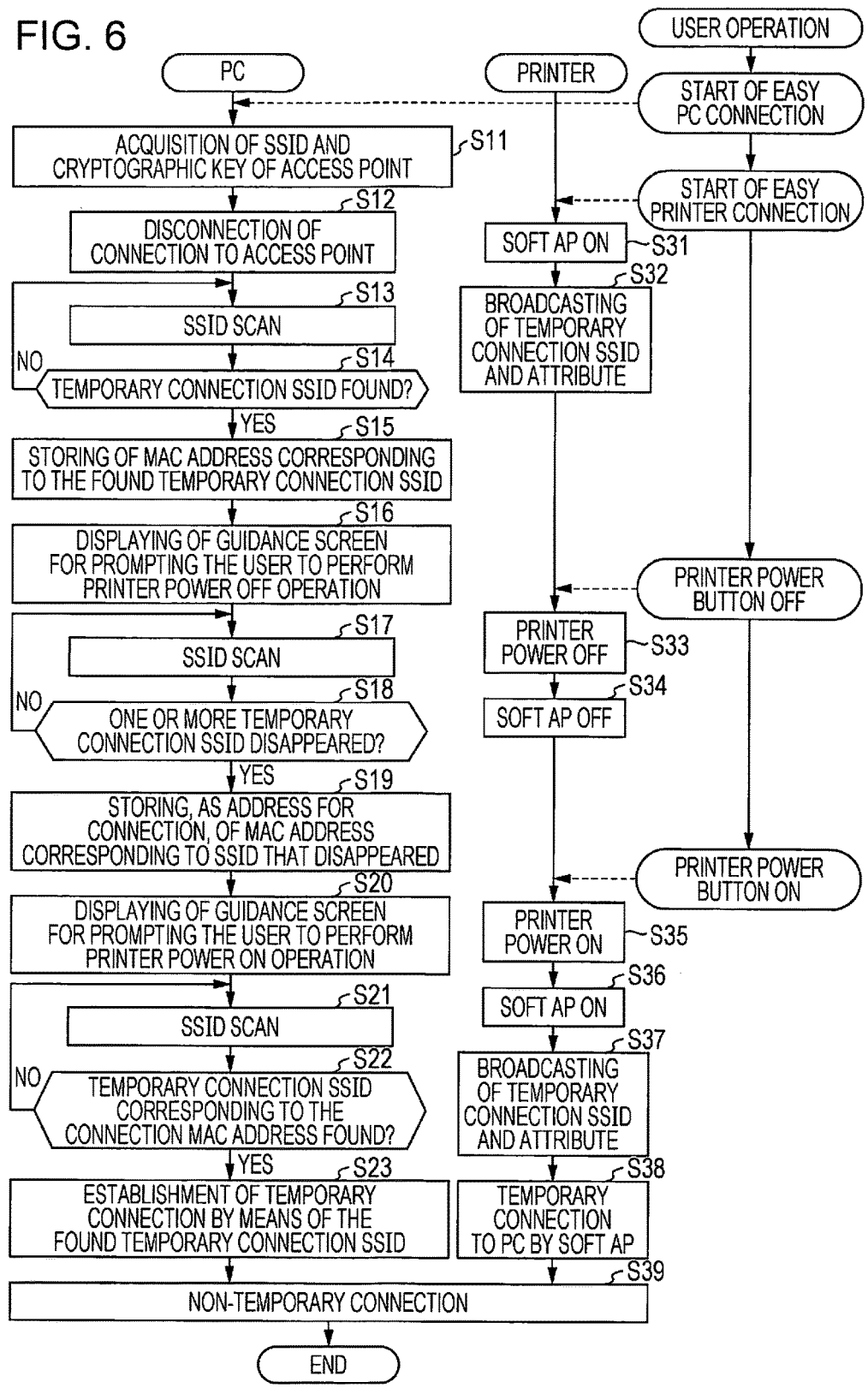
FIG. 6 is a sequence chart that illustrates temporary connection processing for the setting of wireless connection information.

The processing performed by the PC 11 illustrated in FIG. 6 is initiated by launching the wireless setting assistance program by the PC 11 when triggered by user operation. Specifically, when the setup disc 60 that comes bundled with the printing apparatus 21 is set into the insertion slot 12A of the PC 11 by the user, the wireless setting assistance program is automatically loaded from the setup disc 60 into the first control unit 15 and is launched. After the launching of the wireless setting assistance program, the first control unit 15 performs wireless setting assistance processing. The user operation of setting the setup disc 60 into the PC 11 triggers the start of Easy Connect processing (wireless setting assistance processing) by the PC 11. Regarding the processing performed by the printing apparatus 21 illustrated in FIG. 6, the user operation of the power button 24A to power on the printing apparatus 21 first time triggers the start of Easy Connect processing (wireless setting processing) of the printing apparatus 21. That is, the wireless setting assistance processing of this example works by the user's setting the setup disc 60 that comes bundled with the printing apparatus 21 into the insertion slot 12A of the PC 11 and by the user's powering on the printing apparatus 21 first time. Alternatively, Easy Connect processing starts when the wireless setting assistance program associated with a link in "Wireless Setting" of an electronic manual displayed on the display unit 14 of the PC 11 is launched as triggered by link selection operation.

First, upon the launching, the wireless connection processing unit 153 acquires the SSID of the access point 50 and a cryptographic key for it (i.e., non-temporary connection SSID and cryptographic key) (S11). Specifically, the wireless connection processing unit 153 acquires the SSID of the access point 50 and the cryptographic key by sending a query to OS. For the SSID acquired here, a value preset in the wireless setting assistance program is used. The cryptographic key set in the OS is generated from the SSID in accordance with a predetermined rule in the wireless setting assistance program.

Next, the wireless connection processing unit 153 disconnects the connection to the wireless LAN of the access point 50 (S12). Specifically, the wireless connection processing unit 153 instructs the wireless communication unit 16 to disconnect the connection to the wireless LAN, in the infrastructure mode, identified by the SSID of the access point 50. The disconnection puts the PC 11 into a state in which it is possible to perform SSID scanning. The PC 11 performs SSID scanning (S13). During the scanning, the PC 11 judges whether a temporary connection SSID(s) is found or not (S14). In the present embodiment, the processing in the step S13 corresponds to an example of a search step.

The user instructs the printing apparatus 21 to start Easy Connect processing by operating the power button 24A of the printing apparatus 21 (21B) first time. In other words, the printing apparatus 21 starts Easy Connect processing when the power button 24A is operated by the user first time. First, the soft AP 314 is turned ON (S31). In other words, the soft AP 314 is started up.

The soft AP 314 broadcasts a temporary connection SSID and attribute via the wireless communication unit 32 of the printing apparatus 21 (S32). The attribute broadcasted here is information that indicates that the printing apparatus 21 is an access point (relay). Instead of the soft AP 314 or in addition to the soft AP 314, the printing apparatus 21 may include an ad-hoc mode communication unit that makes it possible to perform peer-to-peer (P2P) wireless communication in the ad-hoc mode in order to have an access point function. If the ad-hoc mode communication unit is started up, the attribute of the printing apparatus 21 is broadcasted by the wireless communication unit 32 together with the temporary connection SSID. The attribute contains information that indicates that the apparatus is a parent (master) in wireless LAN communication in the ad-hoc mode. The access point function may be Wi-Fi direct (®).

As a result of the broadcasting of the temporary connection SSID by the printing apparatus 21, the PC 11, which is currently performing the scanning, finds the temporary connection SSID (S14: YES). The PC 11 stores the MAC address(es) (device identification information) of the printing apparatus(es) 21 corresponding to the found temporary connection SSID(s) into the predetermined memory area of the memory unit 17 (S15). Next, the PC 11 causes the display unit 14 to display the guidance screen 71 (FIG. 3), which prompts the user to perform the operation of turning the power of the printing apparatus 21 OFF (S16). That is, the first guidance unit 154 causes the display unit 14 to display the guidance screen 71 illustrated in FIG. 3 for prompting the user to perform the power OFF operation. After the display of the guidance screen 71, the PC11 performs temporary connection SSID scanning (S17). During the scanning, the PC 11 judges whether one or more temporary connection SSIDs have disappeared or not (S18). If one or more temporary connection SSIDs have not disappeared, the process returns to the step S17, and the scanning is continued until one or more temporary connection SSIDs disappear.

Figure 4:
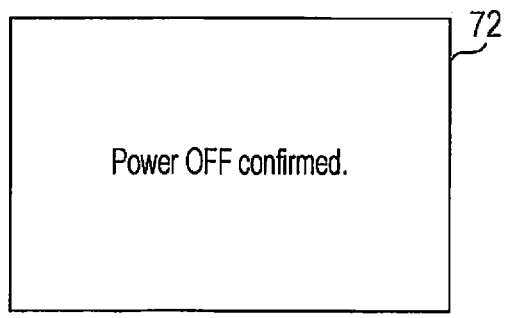
FIG. 4 is a diagram that illustrates a notification message screen displayed on the wireless communication apparatus.

Prompted by the guidance screen 71 displayed on the display unit 14 as illustrated in FIG. 3, the user turns the power button 24A of the connection target printing apparatus 21 (21B) OFF. Receiving an input of a power OFF operation signal due to the OFF operation, the second control unit 31 turns the power of the printing apparatus 21 (21B) OFF (S33). Then, with the power OFF of the printing apparatus 21, the second control unit 31 turns the soft AP 314 OFF (S34). Specifically, the second control unit 31 starts termination processing at the time of power OFF by using the power OFF operation input as a trigger, and turns the soft AP 314 OFF through the termination processing. Because of the turning OFF of the soft AP 314, the broadcasting of the temporary connection SSID stops. As a result, the disappearance of one temporary connection SSID is detected at the PC 11 (S18: YES). Next, the PC 11 stores the MAC address corresponding to the temporary connection SSID that has now disappeared into the predetermined memory area of the memory unit 17 as the connection device identification information. The first guidance unit 154 of the PC 11 causes the display unit 14 to display the notification message screen 72 for letting the user know that power OFF has now been confirmed as illustrated in FIG. 4.

Figure 5:
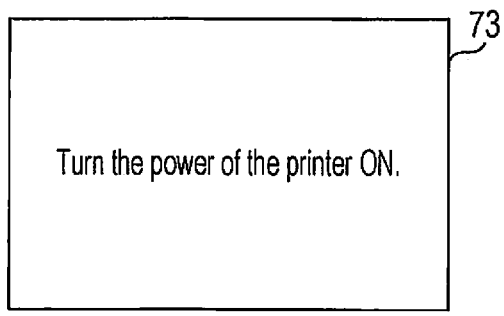
FIG. 5 is a diagram that illustrates a guidance screen displayed on the wireless communication apparatus for prompting a user to perform power ON operation.

Next, the PC 11 causes the display unit 14 to display the guidance screen 73 illustrated in FIG. 5 for prompting the user to perform the operation of turning the power of the printing apparatus 21 ON (S20). That is, the second guidance unit 155 causes the display unit 14 to display the guidance screen 73 illustrated in FIG. 5 for prompting the user to perform the power ON operation. After that, the PC 11 performs temporary connection SSID scanning (S21). During the scanning, the PC 11 judges whether the temporary connection SSID corresponding to the connection MAC address is found or not (S22). If the temporary connection SSID corresponding to the connection MAC address has not been found, the process returns to the step S21, and the scanning is continued until the temporary connection SSID corresponding to the connection MAC address is found.

Viewing the guidance screen 73 illustrated in FIG. 5, the user turns the power button 24A of the connection target printing apparatus 21 (21B) ON in accordance with the instruction of the guidance screen 73. The power of the printing apparatus 21 having accepted the power ON operation goes ON (S35). After the power ON, the soft AP 314 is turned ON (S36). In other words, the printing apparatus 21 starts up the soft AP 314.

The soft AP 314 broadcasts a temporary connection SSID and attribute via the wireless communication unit 32 of the printing apparatus 21 (S32). The attribute broadcasted here is information that indicates that the printing apparatus 21 is an access point (relay).

As a result of the broadcasting of the temporary connection SSID by the printing apparatus 21, the PC 11, which is currently performing the scanning, finds the temporary connection SSID corresponding to the connection MAC address (S22: YES). Then, the PC 11 establishes a peer-to-peer (P2P) temporary connection to the printing apparatus 21 on the basis of the found temporary connection SSID (S23). At this time, in the printing apparatus 21, the soft AP 314 makes the connection to the PC 11 on a peer-to-peer temporary basis (S38). In the present embodiment, each processing in the step S17, S18, S19, S21, and S22 corresponds to an example of a determination step. The processing in the step S23 corresponds to an example of a wireless connection processing step.

Figure 7:
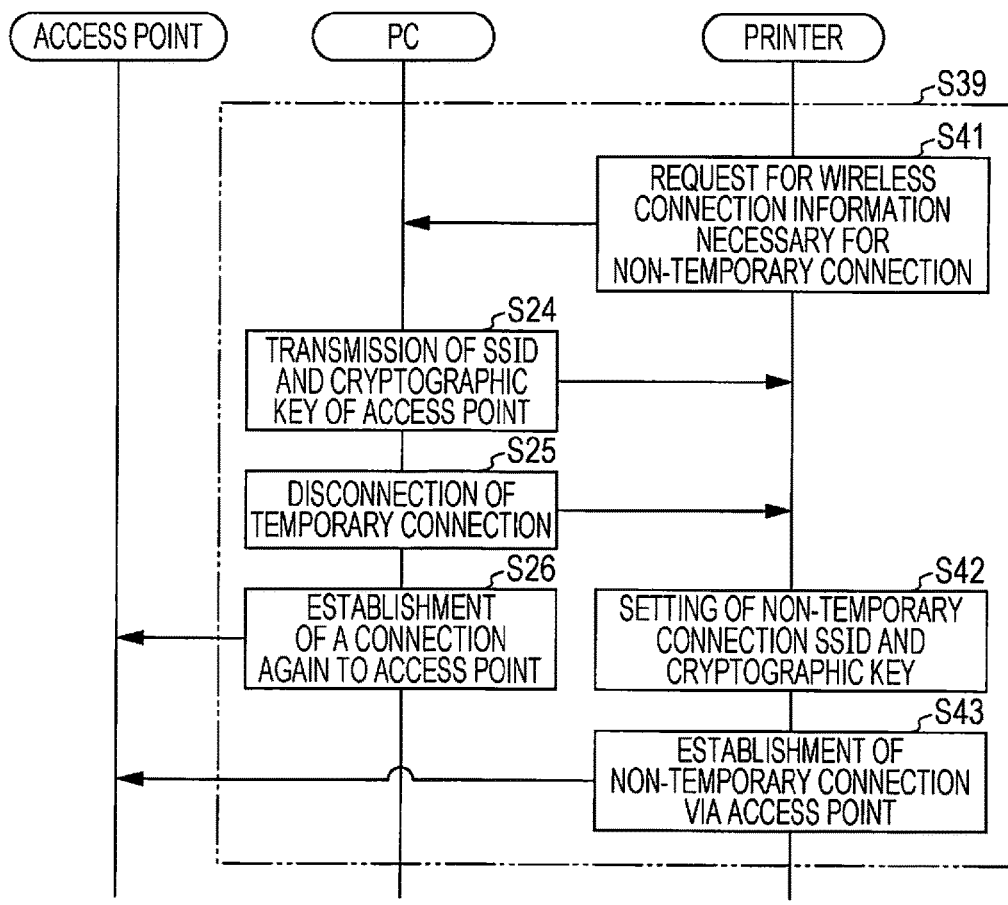
FIG. 7 is a sequence chart that illustrates non-temporary connection processing.

After the establishment of a temporary connection between the PC 11 and the printing apparatus 21, processing for non-temporary connection is performed between the PC 11 and the printing apparatus 21 (S39). Next, with reference to FIG. 7, non-temporary connection processing will now be explained. As illustrated in FIG. 7, the printing apparatus 21 sends a request to the PC 11 for wireless connection information that is necessary for the establishment of a non-temporary connection (S41). That is, the printing apparatus 21 sends a request to the PC 11 for wireless connection information that is necessary for non-temporarily connecting the printing apparatus 21 to the PC 11 via wireless LAN in which the access point 50 is a relay.

Receiving the request for wireless connection information necessary for non-temporary connection, the PC 11 transmits, together with the cryptographic key, the SSID of the access point 50 to the printing apparatus 21 while maintaining a state of temporary connection to the printing apparatus 21 (S24). Next, the PC 11 disconnects the temporary connection to the printing apparatus 21 (S25). Specifically, after the transmission of the SSID of the access point 50 together with the cryptographic key to the printing apparatus 21, the first control unit 15 instructs the wireless communication unit 16 to disconnect the connection to the wireless LAN determined on the basis of the temporary connection SSID that was used for temporary connection.

Next, the PC 11 establishes a connection again to the wireless LAN of the access point 50 (S26). Specifically, the wireless connection processing unit 153 instructs the wireless communication unit 16 to establish a connection to the wireless LAN identified by the SSID of the access point 50. As a result, the wireless communication unit 16 establishes a connection to the access point 50 in an infrastructure mode communication scheme conforming to the standard.

Receiving the wireless connection information containing the non-temporary connection SSID and the cryptographic key from the temporarily-connected PC 11, the printing apparatus 21 sets the non-temporary connection SSID and the cryptographic key (S42). Specifically, the communication setting unit 313 sets, into the wireless communication unit 32, the SSID of the access point 50 and the cryptographic key, which have now been received during the temporary connection to the PC 11.

Next, the printing apparatus 21 establishes a non-temporary connection to the wireless LAN of the access point 50 by using the SSID of the access point 50 and the cryptographic key (S43). Specifically, the non-temporary connection communication unit 312 instructs the wireless communication unit 32 to establish a connection to the wireless LAN identified by the SSID of the access point 50. As a result, the wireless communication unit 32 of the printing apparatus 21 establishes a connection to the PC 11 via the access point 50 functioning as a relay in an infrastructure mode communication scheme conforming to the standard.

Through the processing described above, the connection target printing apparatus 21 and the PC 11 get connected to each other via the infrastructure mode wireless LAN of the access point 50. That is, this connection puts the printing apparatus 21 and the PC 11 into a state of being able to communicate with each other wirelessly in an infrastructure mode communication scheme, with the access point 50 functioning as a relay.

With the first embodiment described above, it is possible to establish an infrastructure mode wireless LAN connection between the printing apparatus 21 and the PC 11, wherein, for the connection, the only thing a user has to do is to set the setup disc 60 that comes bundled with the printing apparatus 21 into the PC 11 and turn the power of the printing apparatus 21 ON. Regardless of whether the soft AP 314 is installed in the PC 11 or not, after the temporary connection of the printing apparatus 21 and the PC 11, it is possible to establish a non-temporary connection via the infrastructure mode wireless LAN in which the access point 50 is a relay. Therefore, with the present embodiment, regardless of whether the soft AP 314 is installed in the printing apparatus 21 or not, it is possible to easily establish a secure wireless communication connection (non-temporary connection) between the PC 11, which is an example of a wireless communication apparatus, and a second wireless communication apparatus.

The first embodiment explained in detail above produces the following advantageous effects.

(1) The search unit 151 searches for the wireless communication device 20 (e.g., the printing apparatus 21) having an access point function. The determination unit 152 determines, among the SSIDs (an example of network identification information) of the wireless communication devices 20 found as a result of the search, an SSID that disappeared from the search target of the wireless communication unit 16 and, after the disappearance, has appeared again. The wireless connection processing unit 153 recognizes, as the connection target device, the wireless communication device 20 corresponding to the SSID determined by the determination unit 152, and performs processing for wireless connection (temporary connection) to the connection target device. By this means, even in a case where plural wireless communication devices 20 that have the same temporary connection SSID exist in the neighborhood of the PC 11 because, for example, they are of the same model, it is possible to recognize the connection target wireless communication device 20, to which a wireless connection should be established, on the basis of the disappearance of the corresponding SSID and subsequent appearance thereof again.

(2) The first guidance unit 154 provides, by display of the guidance screen 71 (FIG. 3), a guidance for prompting the user to perform power OFF operation as an example of the first operation to turn OFF the soft AP 314, which realizes the wireless function of the connection target wireless communication device 20 (connection target device). The second guidance unit 155 provides, by display of the guidance screen 73, a guidance for prompting the user to perform power ON operation as an example of the second operation to turn ON the soft AP 314, which realizes the wireless function of the connection target wireless communication device 20. The wireless connection processing unit 153 recognizes, as the connection target device, the wireless communication device 20 corresponding to, among the SSIDs of the wireless communication devices 20 found as a result of the search, the temporary connection SSID that disappeared due to the first operation (power OFF operation) from the search target of the wireless communication unit 16 and, after the disappearance, has appeared again due to the second operation (power ON operation). Then, the wireless connection processing unit 153 establishes a wireless connection (temporary connection) to the connection target wireless communication device 20. Therefore, when the user performs the first operation (power OFF operation) in accordance with the guidance of the first guidance unit 154, the wireless function of the soft AP 314 is turned OFF. When the user performs the second operation (power ON operation) in accordance with the guidance of the second guidance unit 155, the wireless function of the soft AP 314 is turned ON. Since the guidance for prompting the user to perform operation is provided, it is possible to let the wireless communication apparatus 10 know the connection target device by means of the wireless function OFF/ON operation by the user, thereby easily connecting the wireless communication apparatus 10 and the connection-intended wireless communication device 20 to each other wirelessly.

(3) At least either the first operation of turning the soft AP 314 (wireless function) OFF or the second operation of turning the soft AP 314 (wireless function) ON is the operation of the power button 24A (power operation section), which is operated when the user turns the power of the wireless communication device 20 (printing apparatus 21) ON/OFF. Since the power button 24A is a button operated for power ON/OFF, the use of the power button 24A for wireless function ON/OFF does not cause any feeling of strangeness.

(4) At least either the first operation (power OFF operation) of turning the wireless function OFF or the second operation (power ON operation) of turning the wireless function ON is the operation of the power button 24A, which is operated when the user turns the power of the wireless communication device 20 such as the printing apparatus 21 ON/OFF. Since the power button 24A is a button operated for power ON/OFF, the use of the power button 24A for wireless function ON/OFF does not cause any feeling of strangeness.

(5) The wireless communication apparatus 10 (PC 11) acquires a MAC address (an example of device identification information) corresponding to the temporary connection SSID that disappeared due to the first operation (power OFF operation) by the user from the list of the SSIDs found as a result of the search by the search unit 151, and stores it into the memory unit 17. When the temporary connection SSID corresponding to the same MAC address appears again after the disappearance, the wireless connection processing unit 153 recognizes, as the connection target device, the wireless communication device 20 corresponding to this temporary connection SSID, and performs processing for wireless connection to the connection target device.

(6) The guidance for prompting the user to perform the second operation (power ON operation) is provided after the disappearance of the temporary connection SSID of any wireless communication device 20 due to the first operation (power OFF operation).

(7) Upon establishment of a wireless connection to the connection target device, the wireless connection processing unit of the wireless communication apparatus transmits, to the connection target wireless communication device 20 via the wireless connection, the SSID and the cryptographic key (an example of wireless connection information) having been set to the wireless communication apparatus itself for the purpose of connection to the access point 50 (an example of a wireless relay). The connection target wireless communication device 20 joins onto the wireless network of the access point 50 by means of the SSID and the cryptographic key. As a result, a wireless connection between the PC 11 and the wireless communication device is established via the access point 50. Since the SSID and the cryptographic key are transmitted via the wireless connection, it is possible to establish the wireless connection between the wireless communication apparatus 10 and the wireless communication device 20 via the access point 50.

Second Embodiment

Next, with reference to FIG. 8, a second embodiment will now be explained. In the first embodiment described above, not only the soft AP 314 but also the power are turned OFF when the power button 24A is turned OFF in order to turn the wireless function of the wireless communication device 20 OFF. In contrast, in the present embodiment, the power of the wireless communication device 20 is not turned OFF though the soft AP 314 is turned OFF. The configuration of the wireless communication system WCS of the present embodiment is basically the same as that of the first embodiment. The difference lies only in processing at the wireless communication device 20. In the following explanation of the processing illustrated in FIG. 8, the PC 11 is described as an example of the wireless communication apparatus 10, and the printing apparatus 21 is described as an example of the wireless communication device 20. In the present embodiment, at least the first operation of turning the wireless function OFF is the OFF operation of the power button 24A.

Figure 8:
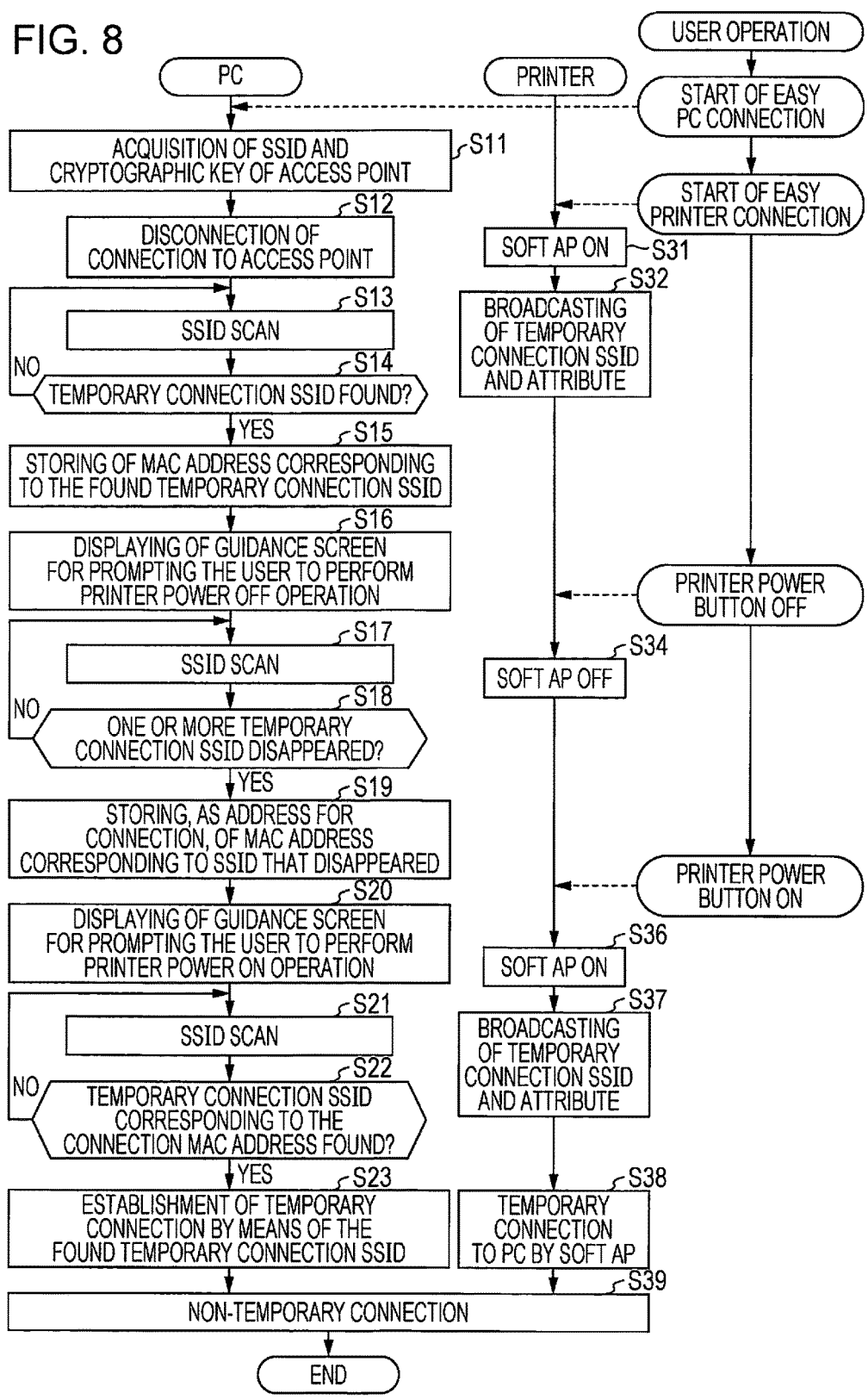
FIG. 8 is a sequence chart that illustrates temporary connection processing for the setting of wireless connection information according to a second embodiment.

As illustrated in FIG. 8, each processing performed by the first control unit 15 of the PC 11 (S11 to S15) and each processing performed by the printing apparatus 21 (S31, S32) upon the start of Easy Connect processing instructed by the user is the same as that of the first embodiment. Before the processing described below, the first control unit 15 of the PC 11 performs SSID scanning (S13) to find the temporary connection SSID (S14), and stores the MAC address corresponding to the found temporary connection SSID into the memory unit 17 (S15). It is assumed that plural temporary connection SSIDs are found, and plural MAC addresses corresponding to the temporary connection SSIDs are stored into the memory unit 17.

As illustrated in FIG. 8, the guidance screen 71 (FIG. 3), which prompts the user to perform the operation of turning the power of the printing apparatus 21 OFF, is displayed on the display unit 14 of the PC 11 (S16). The user turns the power button 24A of the connection target printing apparatus 21 (21B) OFF in accordance with the instruction of the guidance screen 71. The second control unit 31 of the printing apparatus 21 turns the soft AP 314, which is running, OFF to stop it (S34). The second control unit 31 does not turn the power of the printing apparatus 21 OFF, which is performed in the step S33 in FIG. 6 of the first embodiment. Therefore, the power of the printing apparatus 21 is kept to be ON.

After the display of the guidance screen 71 illustrated in FIG. 3, the first control unit 15 of the PC 11 performs SSID scanning (S17). If one or more temporary connection SSIDs disappear (S18: YES), the MAC address corresponding to the SSID that has now disappeared is stored into the predetermined memory area of the memory unit 17 as the address for connection (S19). Next, the first control unit 15 causes the display unit 14 to display the notification message screen 72 (FIG. 4), which shows that the disappearance of one or more temporary connection SSIDs has now been confirmed, and thereafter causes the display unit 14 to display the guidance screen 73 illustrated in FIG. 5 for prompting the user to perform the operation of turning the power of the printing apparatus 21 ON (S20). In the present embodiment, instead of the message of the first embodiment to the effect that power OFF has now been confirmed, a message to the effect that wireless function OFF has now been confirmed is displayed on the notification message screen 72 illustrated in FIG. 4.

In accordance with the instruction of the guidance screen 73 illustrated in FIG. 5, the user turns the power button 24A of the connection target printing apparatus 21 ON. Receiving a signal input indicating the pressing of the power button 24A, the second control unit 31 of the printing apparatus 21 turns the soft AP 314 ON to start it up (S36). Since the printing apparatus 21 is in a power ON state at this time, the second control unit 31 does not have to perform start-up processing of turning the power of the printing apparatus 21 ON in the step S35 in FIG. 6 of the first embodiment.

After the display of the guidance screen 73 illustrated in FIG. 5 for prompting the user to perform power ON operation, the first control unit 15 of the PC 11 performs SSID scanning (S21). If, in the SSID scanning period, the SSID that disappeared appears again due to the turning ON of the soft AP 314 to be found as the temporary connection SSID corresponding to the connection MAC address (S22: YES), a temporary connection to the printing apparatus 21 identified on the basis of the connection MAC address is established on the basis of the temporary connection SSID. At this time, in the printing apparatus 21, the soft AP 314 makes the temporary connection to the PC 11 on the basis of the temporary connection SSID. In this way, the PC 11 and the printing apparatus 21 get connected temporarily to each other on the basis of the temporary connection SSID.

As described above, in the present embodiment, when power OFF operation for the printing apparatus 21 is performed, the soft AP 314 only is turned OFF, meaning that the power of the printing apparatus 21 is not turned OFF. Since the printing apparatus 21 is kept to be in a power ON state, when power ON operation is thereafter performed by the user, waiting time for the starting up of the printing apparatus 21 is saved. Consequently, it is possible to reduce processing time necessary for temporary connection of the PC 11 and the printing apparatus 21 to each other. This makes the time from the start of wireless setting processing to the end of wireless setting processing with the completion of non-temporary connection shorter. Therefore, as compared with the first embodiment, it is possible to finish the setting of wireless connection information into the wireless communication device 20 in a shorter time.

The second embodiment described in detail above produces the following advantageous effect in addition to the effects (1) to (7) described earlier in the first embodiment.

(8) When power OFF operation for the wireless communication device 20 is performed, the power of the wireless communication device 20 is not turned OFF though the soft AP 314 is turned OFF. Therefore, the only thing needed when power ON operation is thereafter performed is to turn the soft AP 314 ON, meaning that it is not necessary to turn the power of the wireless communication device 20 ON to start it up. Therefore, it is possible to finish the setting of wireless connection information into the wireless communication device 20 in a shorter time.

Third Embodiment

Next, with reference to FIG. 9, a third embodiment will now be explained. In the first and second embodiments described earlier, the user has to operate the power button 24A twice, specifically, at the time of turning the soft AP 314 OFF and turning it ON. The present embodiment is different from the foregoing embodiments in that it is sufficient if the user operates the power button 24A just once, specifically, only at the time of turning the soft AP 314 OFF. The configuration of the wireless communication system WCS of the present embodiment is basically the same as that of the first embodiment. The difference lies only in processing at the wireless communication device 20. The CPU of the second control unit 31 of the printing apparatus 21 is provided with a timer (not illustrated) that is, for example, a counter configured to receive a clock signal input and count the number of pulse edges in the signal. In the following explanation of the processing illustrated in FIG. 9, the PC 11 is described as an example of the wireless communication apparatus 10, and the printing apparatus 21 is described as an example of the wireless communication device 20.

If temporary connection SSIDs are found (S14 in FIGS. 6 and 8: YES) as a result of SSID scanning (S13 in FIGS. 6 and 8), the first control unit 15 of the PC 11 stores the MAC addresses corresponding to the found temporary connection SSIDs into the predetermined memory area of the memory unit 17 (S15 in FIGS. 6 and 8). The processing illustrated in FIG. 9 follows the above processing.

As illustrated in FIG. 9, the first control unit 15 of the PC 11 (wireless communication apparatus 10) causes the display unit 14 to display the guidance screen 71 illustrated in FIG. 3 for prompting the user to perform the operation of turning the power of the printing apparatus 21 OFF (S16). Next, the first control unit 15 of the PC 11 performs temporary connection SSID scanning (S17) to judge whether one or more temporary connection SSIDs have disappeared or not (S18). If the result of the judgment regarding SSID disappearance is affirmative (S18: YES), the MAC address corresponding to the SSID that has now disappeared is stored into the predetermined memory area of the memory unit 17 as the address for connection (S19). The first control unit 15 causes the display unit 14 to display the notification message screen 72 (FIG. 4), which shows that the disappearance has now been confirmed, and thereafter causes the display unit 14 to display the guidance screen 73 (FIG. 5), which prompts the user to perform power ON operation.

The user operates the power button 24A of the connection target printing apparatus 21 (wireless communication device 20) in accordance with the instruction of the guidance screen 71. The second control unit 31 of the printing apparatus 21 turns the soft AP 314, which is running, OFF to stop it (S34). At this time, the second control unit 31 does not turn the power of the printing apparatus 21 OFF. The second control unit 31 causes the timer to measure the time elapsed since the turning OFF of the soft AP 314. Then, the second control unit 31 judges whether the time measured by the timer has reached set time or not (S40). Upon the lapse of the set time from the turning OFF of the soft AP 314, the second control unit 31 turns the soft AP 314 ON to start it up (S36). The value of the set time is the sum of the time necessary for the search unit 151 to find all SSIDs in the search area and slight margin time. For example, the set time is a value within a range from 100 msec to 5 sec.

After the turning ON of the soft AP 314, the second control unit 31 of the printing apparatus 21 performs the broadcasting of a temporary connection SSID and attribute (S37). If the SSID that disappeared appears again due to the turning ON of the soft AP 314 to be found, by the first control unit 15 having started SSID scanning, as the temporary connection SSID corresponding to the connection MAC address (S22: YES), a peer-to-peer (P2P) temporary connection to the printing apparatus 21 is established on the basis of the found temporary connection SSID. At this time, in the printing apparatus 21, the soft AP 314 makes the temporary connection to the PC 11 on the basis of the temporary connection SSID. In this way, the PC 11 and the printing apparatus 21 get connected temporarily to each other on the basis of the temporary connection SSID.

As described above, in the present embodiment, it is sufficient if the user operates the power button 24A just once, specifically, only at the time of turning the soft AP 314 in the printing apparatus 21 OFF, meaning that the operation of turning the soft AP 314 ON after that is not necessary. Therefore, it is possible to reduce the number of times of the operation of the operation unit 24 necessary when the user makes wireless settings.

Moreover, as in the second embodiment, when the operation of turning the power of the printing apparatus 21 OFF is performed by the user in accordance with the instruction of the guidance screen 71, the soft AP 314 only is turned OFF, meaning that the power of the printing apparatus 21 is not turned OFF. Waiting time for the starting up of the printing apparatus 21 is not necessary when power ON operation for the printing apparatus 21 is performed after the turning OFF of the soft AP 314 by turning the power button 24A OFF. Consequently, it is possible to reduce processing time necessary for temporary connection of the PC 11 and the printing apparatus 21 to each other. This makes the time from the start of wireless setting processing to the completion of non-temporary connection shorter. Therefore, as compared with the first embodiment, it is possible to finish the setting of wireless connection information including network identification information into the wireless communication device 20 in a shorter time.

(9) The first guidance unit 154 provides a guidance for prompting the user to perform power OFF operation (first operation) of turning OFF the wireless function realized by the soft AP 314 of the connection target wireless communication device 20. The wireless communication apparatus 10 recognizes, as the connection target device, the wireless communication device 20 corresponding to, among the temporary connection SSIDs found as a result of the search, the temporary connection SSID that disappeared due to the power OFF operation from the search target of the wireless communication unit 16 and has appeared again after the lapse of the set time. Then, the wireless communication apparatus 10 establishes a temporary connection (wireless connection) to the connection target wireless communication device 20. Upon the lapse of the set time, the soft AP 314 (wireless function) is turned ON, and the SSID that disappeared appears again. Therefore, the guidance for prompting the user to perform the operation of turning the wireless function of the connection target device ON is not necessary. Moreover, the user does not have to operate the operation unit 24 in order to turn the wireless function ON.

Fourth Embodiment

Next, a fourth embodiment will now be explained. The present embodiment is modified from the third embodiment as follows: it is possible to determine the printing apparatus 21 used as a standalone printer, and the user does not perform the first operation (power OFF operation) and the second operation (power ON operation). For example, time is measured by the timer, and the printing apparatus 21 turns the soft AP 314 OFF and ON automatically upon the lapse of set time from a predetermined point in time. If, for example, there exists another printing apparatus of the same model used as a standalone printer with no wireless settings made when powered ON first time, yet-to-be-set equipment information, which indicates that wireless settings have not been made yet, is stored in the memory unit of the standalone printer 21. When the setup disc 60 is set into the wireless communication apparatus 10 by the user, the first control unit 15 launches the wireless setting assistance program. First, the display unit 14 displays a guidance screen (not illustrated) for prompting the user to perform the operation of turning the power of the wireless communication device 20 ON. In accordance with the instruction of the guidance screen, the user performs the operation of turning the power of the wireless communication device 20 ON. As a result, the wireless communication device 20 (e.g., the printing apparatus 21) is powered ON. If yet-to-be-set equipment information indicative of standalone equipment is set in the memory unit 34, the user is deemed as not having any intention to set wireless connection information. In this case, the second control unit 31 aborts subsequent processing. If the yet-to-be-set equipment information is not set, the soft AP 314 is turned ON. The second control unit 31 of the wireless communication device 20 causes the timer to measure the time elapsed since the inputting of a power ON operation signal or since the turning ON of the soft AP 314. When the time measured by the timer reaches first set time, the second control unit 31 turns the soft AP 314 OFF. The first set time is long enough so that the wireless communication apparatus 10 can find the SSID broadcasted from the wireless communication device 20 from the time of the turning ON of the soft AP 314 of the wireless communication device 20. Therefore, the search unit 151 of the wireless communication apparatus 10 finds the temporary connection SSID broadcasted from the wireless communication device 20 powered ON by the user. The determination unit 152 of the wireless communication apparatus 10 determines, among the temporary connection SSIDs found as a result of the search, an SSID that disappeared and has appeared again after the disappearance as the target of wireless setting. When the SSID disappears, the MAC address of the wireless communication device 20 corresponding to the SSID that has now disappeared is stored into the memory unit 17.

Next, the second control unit 31 causes the timer to measure the time elapsed since the turning OFF of the soft AP 314. When the time measured by the timer reaches second set time, the second control unit 31 turns the soft AP 314 ON. The second set time is long enough so that the first control unit 15 of the wireless communication apparatus 10 can confirm the disappearance of any one among the SSIDs found as a result of the search. At the wireless communication apparatus 10, among the plurality of the same temporary connection SSIDs found, an SSID that disappeared and has appeared again after the disappearance due to the turning OFF and ON of the soft AP 314 is determined as the target of wireless setting. In this way, the wireless communication apparatus 10 can determine, and get temporarily connected to, the wireless communication device 20. In a case where the printing apparatus 21 used as a standalone printer can be determined as described above, the second control unit 31 turns the soft AP 314 OFF and ON automatically without user operation. Therefore, the user does not have to operate the operation unit 24 so as to temporarily connect the wireless communication apparatus 10 to the wireless communication device 20 for which the user wishes the settings of wireless connection information to be made.

The foregoing embodiments may be modified as follows.

Regarding the scheme for wireless communication based on temporary connection, any method can be employed as long as at least either the wireless communication apparatus or the wireless communication device has an access point function and functions as a wireless relay. For example, the wireless communication apparatus 10 may have a built-in soft access point. Alternatively, both of the wireless communication apparatus 10 and the wireless communication device 20 may have a built-in soft access point.

In the foregoing embodiments, wireless connection information is set into the wireless communication device 20 via temporary connection to the wireless communication apparatus 10, and the non-temporary connection of the wireless communication device 20 is thereafter established. However, as long as a peer-to-peer (P2P) connection between the wireless communication device 20 and the wireless communication apparatus 10, with an access point function, is established, the connection is not limited to temporary connection; it may be non-temporary connection. In a case where the connection is temporary connection, the processing performed via temporary connection is not limited to the setting of wireless connection information. Other kind of setting processing, or processing other than setting processing, may be performed via temporary connection. For example, a program such as a print control program or a function addition program for the wireless communication device 20 may be transmitted from the wireless communication apparatus 10 to the wireless communication device 20.

The SSID disclosed as an example of network identification information may include an ESSID (Extended Service Set Identifier). In place of the SSID, a BSSID (Basic Service Set Identifier) may be used as network identification information. Ideally, wireless connection information for the establishment of a temporary connection or a non-temporary connection should contain some kind of a passphrase such as a cryptographic key. However, containing a cryptographic key is not always necessary.

In the foregoing embodiments, the operation of the power button 24A of the printing apparatus 21 first time triggers the initiation of Easy Connect processing. However, Easy Connect processing may be started when the operation button 24B specified in the menu display of the display unit 14, other than the power button 24A, is operated. In such a case, the triggering operation does not have to be the first-time operation of the printing apparatus 21.

Different wireless communication schemes may be used for temporary connection and non-temporary connection. For example, as the wireless communication scheme for temporary connection, Bluetooth (®) or infrared communication (IrDA, etc.) may be used in place of wireless LAN, whereas wireless LAN is used for non-temporary connection. Bluetooth (®) or infrared communication (IrDA, etc.) may be used for non-temporary connection in place of wireless LAN. If any communication scheme other than wireless LAN is used, information other than network identification information may be searched in the search process.

In the foregoing embodiments, the wireless communication apparatus is a PC, the wireless communication device is a printing apparatus, and the PC provides assistance in setting wireless connection information to the printing apparatus. However, they may be reversed. Specifically, the wireless communication apparatus may be a printing apparatus, the wireless communication device may be a PC, and the printing apparatus may perform wireless setting assistance processing by using the access point function of the PC to help the PC to set wireless connection information.

In the foregoing embodiments, the wireless communication apparatus is a PC, and the wireless communication device is a printing apparatus. However, other combination may be employed. For example, the combination of the wireless communication apparatus and the wireless communication device may be a printing apparatus and another printing apparatus, or a PC and another PC. The combination of the wireless communication apparatus and the wireless communication device may be a PC and a portable terminal, or a portable terminal and a printing apparatus. The wireless communication device may be a scanner (image reading apparatus), a facsimile, a digital camera, video equipment such as a projector, a home appliance, a smartphone, or other electronic equipment. The wireless communication device may be a multi-function printer that has a scan function and a facsimile function, etc.

The case where plural pieces of the same network identification information might be found when a search is conducted is not limited to a case where network identification information (e.g., SSID) for temporary connection is shared among wireless communication devices 20 of the same model. Other examples are: common network identification information is set for each identical manufacturer, for each identical time period such as a device sales period or a device production period, for each identical manufacturing lot, or for each identical territory such as a sales territory or a production territory. Even if individual network identification information for temporary connection is set for each wireless communication device 20, it applies when pieces of the same network identification information exist for some reason or other. To sum up, the disclosed technique can be applied to a situation in which plural wireless communication devices having the same network identification information might be found on the same wireless network.

The wireless setting assistance processing performed by the first control unit 15 is not limited to software processing performed by a computer on which a program runs. It may be embodied as hardware processing performed by, for example, an electronic circuit, or may be embodied by collaborative operation of software and hardware.

What is claimed is:

1. A wireless communication apparatus, comprising:
   a search section that performs searches for network identification information of at least one wireless communication device that has an access point function via a wireless communication section;
   a determination section that determines that, among pieces of network identification information found as a result of a first search by the search section, a piece of network identification information has disappeared in response to a second search by the search section after the first search, and determines that the piece of network identification information has appeared again in response to a third search by the search section after the second search; and
   a wireless connection processing section that performs processing for wireless connection to a connection target device that is a wireless communication device corresponding to the piece of network identification information.

2. The wireless communication apparatus according to claim 1, further comprising:

a first guidance section that provides a guidance for prompting a user to perform a first operation to turn off a wireless function of the connection target device; and a second guidance section that provides a guidance for prompting the user to perform a second operation to turn on the wireless function of the connection target device, wherein the wireless connection processing section recognizes, as the connection target device, the wireless communication device corresponding to the piece of network identification information that has disappeared from a search target of the wireless communication section due to the first operation and has appeared again due to the second operation after the disappearance among the pieces of network identification information of the at least one wireless communication device found as the result of the first search, and performs the processing for the wireless connection to the connection target device.

3. The wireless communication apparatus according to claim 1, further comprising:

a first guidance section that provides a guidance for prompting a user to perform a first operation to turn off a wireless function of the connection target device;

wherein the connection target device is configured to turn on the wireless function after a lapse of set time from turning off of the wireless function due to the first operation; and wherein the wireless connection processing section recognizes, as the connection target device, the wireless communication device corresponding to the piece of network identification information that has been disappeared from a search target of the wireless communication section due to the first operation and has appeared again after the disappearance among the pieces of network identification information of the at least one wireless communication device found as the result of the first search, and establishes the wireless connection to the connection target device.

4. The wireless communication apparatus according to claim 2, wherein at least either the first operation of turning off the wireless function and the second operation of turning on the wireless function is operation of a power operation section that is operated when the user turns power of the wireless communication device on/off.

5. The wireless communication apparatus according to claim 4, wherein at least the first operation of turning off the wireless function is the operation of the power operation section that is operated when the user turns the power of the wireless communication device on/off;

wherein the wireless communication device is configured to turn off the wireless function without turning the power off when the first operation is performed by means of the power operation section; and wherein the wireless connection processing section recognizes, as the connection target device, the wireless communication device corresponding to the piece of network identification information that has disappeared from a search target of the wireless communication section due to the first operation and has appeared again due to the second operation after the disappearance among the pieces of network identification information of the at least one wireless communication device found as the result of the first search, and performs the processing for the wireless connection to the connection target device.

6. The wireless communication apparatus according to claim 2, wherein the guidance for prompting the user to perform the second operation is provided by the second guidance section after the disappearance of any one piece of network identification information due to the first operation among the pieces of network identification information found as the result of the first search.

7. The wireless communication apparatus according to claim 2, wherein device identification information corresponding to the piece of network identification information that has disappeared due to the first operation among the pieces of network identification information found as the result of the first search by the search section is acquired and stored into a memory; and wherein, when the piece of network identification information corresponding to the same device identification information appears again thereafter as the result of the third search by the search section, the wireless connection processing section recognizes, as the connection target device, the wireless communication device corresponding to the piece of network identification information that has appeared in response to the third search by the search section, and performs the processing for the wireless connection to the connection target device.

8. The wireless communication apparatus according to claim 1, wherein, upon establishment of the wireless connection to the connection target device, the wireless connection processing section transmits, to the connection target device via the wireless connection, wireless connection information having been set to the wireless communication apparatus itself for purpose of connection to a wireless relay; and wherein the connection target device joins onto a wireless network of the wireless relay by means of the wireless connection information, and, as a result, a wireless connection to the wireless communication device is established via the wireless relay.

9. A wireless communication method, comprising:

performing searches for network identification information of at least one wireless communication device that has an access point function via a wireless communication section;

determining that, among pieces of network identification information found as a result of a first search, a piece of network identification information has disappeared in response to a second search after the first search;

determining that the piece of network identification information has appeared again in response to a third search after the second search; and performing processing for wireless connection to a connection target device that is a wireless communication device corresponding to the piece of network identification information.

10. A non-transitory computer-readable storage medium storing a program for causing a computer of a wireless communication apparatus to execute a process, comprising:

performing searches for network identification information of at least one wireless communication device that has an access point function via a wireless communication section;

determining that, among pieces of network identification information found as a result of a first search, a piece of network identification information has disappeared in response to a second search after the first search,
determining that the piece of network identification information has appeared again in response to a third search after the second search; and
performing processing for wireless connection to a connection target device that is a wireless communication device corresponding to the piece of network identification information.

* * * * *